United States Patent
Holley et al.

(10) Patent No.: US 9,282,378 B2
(45) Date of Patent: Mar. 8, 2016

(54) CREDIT-BASED TELEVISION COMMERCIAL SYSTEM

(71) Applicant: EchoStar Technologies L.L.C., Englewood, CO (US)

(72) Inventors: Eric Holley, Atlanta, GA (US); Frederick Tuck, Dunwoody, GA (US)

(73) Assignee: Echostar Technologies, L.L.C., Englewood, CO (US)

( * ) Notice: Subject to any disclaimer, the term of this patent is extended or adjusted under 35 U.S.C. 154(b) by 35 days.

(21) Appl. No.: 14/102,144

(22) Filed: Dec. 10, 2013

(65) Prior Publication Data
US 2015/0163560 A1   Jun. 11, 2015

(51) Int. Cl.
| H04N 21/262 | (2011.01) |
|---|---|
| H04N 21/2668 | (2011.01) |
| H04N 21/433 | (2011.01) |
| H04N 21/442 | (2011.01) |
| H04N 21/475 | (2011.01) |
| H04N 21/61 | (2011.01) |
| H04N 21/2543 | (2011.01) |
| H04N 21/4185 | (2011.01) |

(52) U.S. Cl.
CPC ....... *H04N 21/6143* (2013.01); *H04N 21/2543* (2013.01); *H04N 21/4185* (2013.01); *H04N 21/6168* (2013.01); *H04N 21/6175* (2013.01); *H04N 21/6181* (2013.01); *H04N 21/6187* (2013.01)

(58) Field of Classification Search
None
See application file for complete search history.

(56) References Cited

U.S. PATENT DOCUMENTS

| 8,005,713 | B1 | 8/2011 | Sanz-Pastor | |
|---|---|---|---|---|
| 2002/0055854 | A1* | 5/2002 | Kurauchi | H04N 7/17318 725/32 |
| 2004/0255322 | A1* | 12/2004 | Meadows | H04N 7/17309 725/23 |
| 2007/0288951 | A1* | 12/2007 | Ray | G06Q 30/02 725/23 |
| 2008/0221986 | A1 | 9/2008 | Soicher et al. | |
| 2010/0273553 | A1 | 10/2010 | Zalewski | |
| 2011/0166917 | A1* | 7/2011 | Shang | G06Q 30/02 705/14.7 |
| 2012/0124608 | A1 | 5/2012 | Postrel | |

OTHER PUBLICATIONS

International Search Report and Written Opinion for PCT/US2014/064106 mailed Feb. 6, 2015, 14 pages.

* cited by examiner

*Primary Examiner* — Brian T Pendleton
*Assistant Examiner* — Jean D Saint Cyr
(74) *Attorney, Agent, or Firm* — Kilpatrick Townsend & Stockton LLP

(57) ABSTRACT

Various arrangements are provided for earning and using credit. Via one or more tuners, a first commercial may be received and stored, wherein the first commercial comprises video and audio. The commercial may be output for presentation for viewing by a user of the television receiver system, wherein the first commercial is associated with a first predefined amount of credit. It may then be confirmed that the first commercial has been viewed by the user. In response to confirming that the first commercial has been viewed by the user, an account of the user may be credited with the first predefined amount of credit. This credit may be used for viewing other content, such as pay-per-view (PPV) content, services, and/or products.

14 Claims, 7 Drawing Sheets

CREDIT-BASED TELEVISION COMMERCIAL SYSTEM

BACKGROUND

From the point-of-view of a television user, commercials can be considered a double-edged sword. While advertisers fund the cost of much television programming, the user is forced to watch commercials, delaying the user's view of desired television programming. On many television channels, especially those which do not have high or any subscription fees, commercials often interrupt the television programming that the subscriber is interested in viewing. These commercials, however, can represent significant advertising revenues. For other television programs, such as pay-per-view television programs, commercials may not be interspersed in the television program, but the television subscriber may pay a fee to view the pay-per-view television program.

SUMMARY

In some embodiments, a television receiver system configured to provide content-viewing credit is presented. The television receiver system may include one or more tuners. The television receiver system may include one or more processors. The television receiver system may include a memory communicatively coupled with and readable by the one or more processors and having stored therein processor-readable instructions which, when executed by the one or more processors, cause the one or more processors to receive, via the one or more tuners, a first commercial, wherein the first commercial comprises video and audio. The instructions may further cause the one or more processors to output for presentation the first commercial for viewing by a user of the television receiver system, wherein the first commercial is associated with a first predefined amount of credit. The instructions may further cause the one or more processors to confirm that the first commercial has been viewed by the user. The instructions may further cause the one or more processors to, in response to confirming that the first commercial has been viewed by the user, credit an account of the user with the first predefined amount of credit.

Embodiments of such a system may include one or more of the following: The instructions may further cause the one or more processors to receive user input that selects a pay-per-view piece of content, wherein the pay-per-view piece of content is associated with a second predefined amount of credit. The instructions may further cause the one or more processors to receive user input indicative of applying credit from the account of the user to purchase of presentation of the pay-per-view piece of content. The instructions may further cause the one or more processors to determine that a third amount of credit available in the account of the user is equal to or greater than the second predefined amount of credit. The instructions may further cause the one or more processors to, after determining that an amount of credit in the account of the user is equal to or greater than the second predefined amount of credit, commence presentation of the pay-per-view piece of content. The instructions may further cause the one or more processors to store the first commercial to the memory of the television receiver system prior to outputting for presentation the first commercial. The instructions may further cause the one or more processors to store the pay-per-view piece of content to the memory of the television receiver system prior to outputting for presentation the first commercial. The instructions may further cause the one or more processors to receive user input that selects the first commercial for viewing from a plurality of commercials stored by the television receiver system.

Additionally or alternatively, embodiments of such a system may include one or more of the following: The instructions may further cause the one or more processors to, prior to receiving the user input that selects the first commercial, output for presentation a listing of the plurality of commercials organized based on categories of commercials within the plurality of commercials. Each commercial of the plurality of commercials may be associated with a predefined amount of credit. The listing of the plurality of commercials may indicate, for each commercial, the associated predefined amount of credit. The processor-readable instructions that cause the one or more processors to confirm that the first commercial has been viewed by the user may comprise processor-readable instructions which, when executed, cause the one or more processors to output for presentation, concurrently with video of the first commercial being output, a graphical element prompting user input. The instructions may further cause the one or more processors to receive user input in response to the graphical element. The instructions may further cause the one or more processors to, in response to the user input, output for presentation information related to the first commercial. The system may include a system credit management engine. The engine may receive, from a plurality of television receivers, indications of the first commercial being viewed. The engine may, based on the indications of the first commercial being viewed, billing an entity associated with the first commercial an amount based on a quantity of indications.

In some embodiments, a method for providing content-viewing credit may be presented. The method may include receiving, via one or more tuners of a television receiver, a first commercial, wherein the first commercial comprises video and audio. The method may include outputting, by the television receiver, for presentation the first commercial for viewing by a user, wherein the first commercial is associated with a first predefined amount of credit. The method may include confirming, by the television receiver, that the first commercial has been viewed by the user. The method may include, in response to confirming that the first commercial has been viewed by the user, crediting, by the television receiver, an account of the user with the first predefined amount of credit.

Embodiments of such a method may include one or more of the following: The method may include receiving, by the television receiver, user input that selects a pay-per-view piece of content, wherein the pay-per-view piece of content is associated with a second predefined amount of credit. The method may include receiving, by the television receiver, user input indicative of applying credit from the account of the user to purchase of presentation of the pay-per-view piece of content. The method may include determining that a third amount of credit available in the account of the user is equal to or greater than the second predefined amount of credit. The method may include, after determining that an amount of credit in the account of the user is equal to or greater than the second predefined amount of credit, commencing presentation of the pay-per-view piece of content. The method may include storing, by the television receiver, the first commercial to a memory of the television receiver prior to outputting for presentation the first commercial. The method may include storing, by the television receiver, the pay-per-view piece of content to the memory of the television receiver prior to outputting for presentation the first commercial. The method may include receiving, by the television receiver user input that selects the first commercial for viewing from a plurality of commercials stored by the television receiver. The method may include, prior to receiving the user input that selects the first commercial, outputting, by the television receiver, for presentation a listing of the plurality of commercials organized based on categories of commercials within the plurality of commercials. Each commercial of the plurality of commercials may be associated with a predefined amount of credit. The listing of the plurality of commercials may indicate, for each commercial, the associated predefined amount of credit. The method may include outputting, by the television receiver, for presentation, concurrently with video of the first commercial being output, a graphical element prompting user input. The method may include receiving, by the television receiver, user input in response to the graphical element. The method may include in response to the user input, outputting, by the television receiver, for presentation information related to the first commercial. The method may include receiving, from a plurality of television receivers, by a server system, indications of the first commercial being viewed. The method may include based on the indications of the first commercial being viewed, billing an entity associated with the first commercial an amount based on a quantity of indications.

In some embodiments, a non-transitory processor-readable medium for providing content-viewing credit is presented. The non-transitory processor-readable medium may include processor-readable instructions configured to cause one or more processors to receive a first commercial, wherein the first commercial comprises video and audio. The instructions may further cause the one or more processors to output for presentation the first commercial for viewing by a user, wherein the first commercial is associated with a first predefined amount of credit. The instructions may further cause the one or more processors to confirm that the first commercial has been viewed by the user. The instructions may further cause the one or more processors to, in response to confirming that the first commercial has been viewed by the user, credit an account of the user with the first predefined amount of credit.

Embodiments of such a non-transitory computer-readable medium may include one or more of the following: The instructions may further cause the one or more processors to receive user input that selects a pay-per-view piece of content, wherein the pay-per-view piece of content is associated with a second predefined amount of credit. The instructions may further cause the one or more processors to receive user input indicative of applying credit from the account of the user to purchase of presentation of the pay-per-view piece of content. The instructions may further cause the one or more processors to determine that a third amount of credit available in the account of the user is equal to or greater than the second predefined amount of credit. The instructions may further cause the one or more processors to, after determining that an amount of credit in the account of the user is equal to or greater than the second predefined amount of credit, commence presentation of the pay-per-view piece of content. The instructions may further cause the one or more processors to store the first commercial to a memory of a television receiver prior to outputting for presentation the first commercial. The instructions may further cause the one or more processors to store the pay-per-view piece of content to the memory of the television receiver prior to outputting for presentation the first commercial. The instructions may further cause the one or more processors to receive user input that selects the first commercial for viewing from a plurality of commercials stored by a television receiver. The instructions may further cause the one or more processors to, prior to receiving the user input that selects the first commercial, output for presentation a listing of the plurality of commercials organized based on categories of commercials within the plurality of commercials. Each commercial of the plurality of commercials may be associated with a predefined amount of credit. The listing of the plurality of commercials may indicate, for each commercial, the associated predefined amount of credit. The processor-readable instructions may be configured to cause the one or more processors to confirm that the first commercial has been viewed by the user comprise processor-readable instructions configured to cause the one or more processors to output for presentation, concurrently with video of the first commercial being output, a graphical element prompting user input. The instructions may further cause the one or more processors to receive user input in response to the graphical element The instructions may further cause the one or more processors to, in response to the user input, output for presentation information related to the first commercial.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In some situations, a user may prefer to watch commercials rather than paying a fee to view pay-per-view (PPV) content. The user may prefer to view commercials, possibly of the user's choosing, to accumulate a sufficient amount of credit to view PPV content (or some other form of content) rather than paying for the right to review the PPV content. In some embodiments, a user is permitted to select from a listing of available commercials. Each of these commercials may be associated with an amount of credit. The user may view the commercial. In some embodiments, following the commercial being presented to the user, the user may be requested to answer one or more questions or to take a brief survey. The questions and/or survey may be used to confirm that the user did in fact view the commercial and/or gather market research data. Following confirmation of the user viewing the commercial, an amount of credit associated with the commercial may be credited to an account of the user. In some embodiments, a television commercial may be broadcast on a television channel. During the commercial, an interactive graphical element (e.g., a pop-up) may be presented that a user is permitted to select by providing user input. The user may be awarded with an amount of credit for interacting with such a graphical element. For instance, viewing a graphical display of additional information about a product being advertised may result in the user being awarded an amount of credit.

Figure 1:
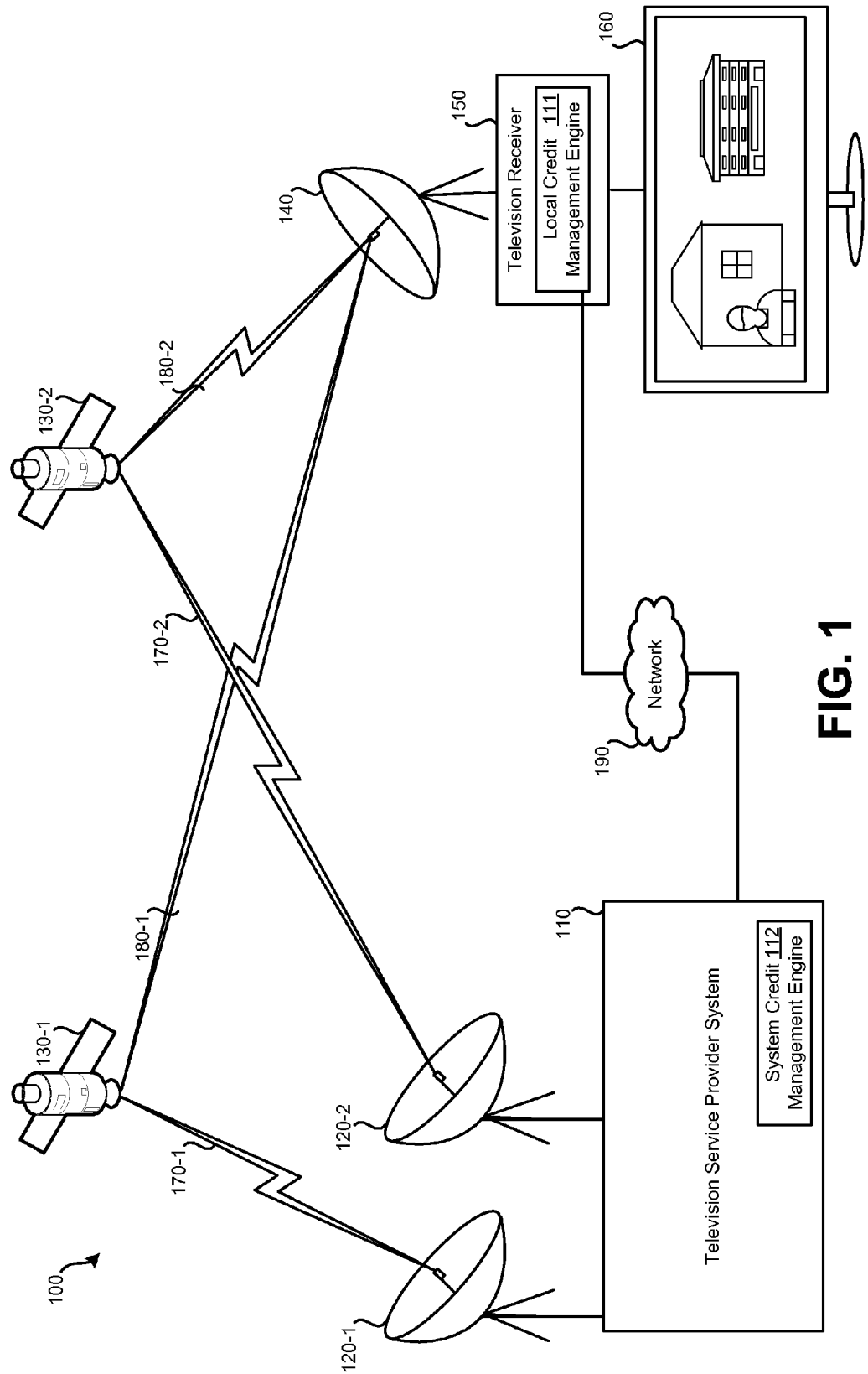
FIG. 1 illustrates an embodiment of a satellite-based television distribution system.

FIG. 1 illustrates an embodiment of a satellite television distribution system 100. Satellite television distribution system 100 may be configured to allow credits based on interactions with commercials to be earned and redeemed. Satellite television distribution system 100 may include: television service provider system 110, satellite transmitter equipment 120, satellites 130, satellite dish 140, television receiver 150, system credit management engine 112, local credit management engine 111, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming (including PPV content and credit-earning commercials), programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
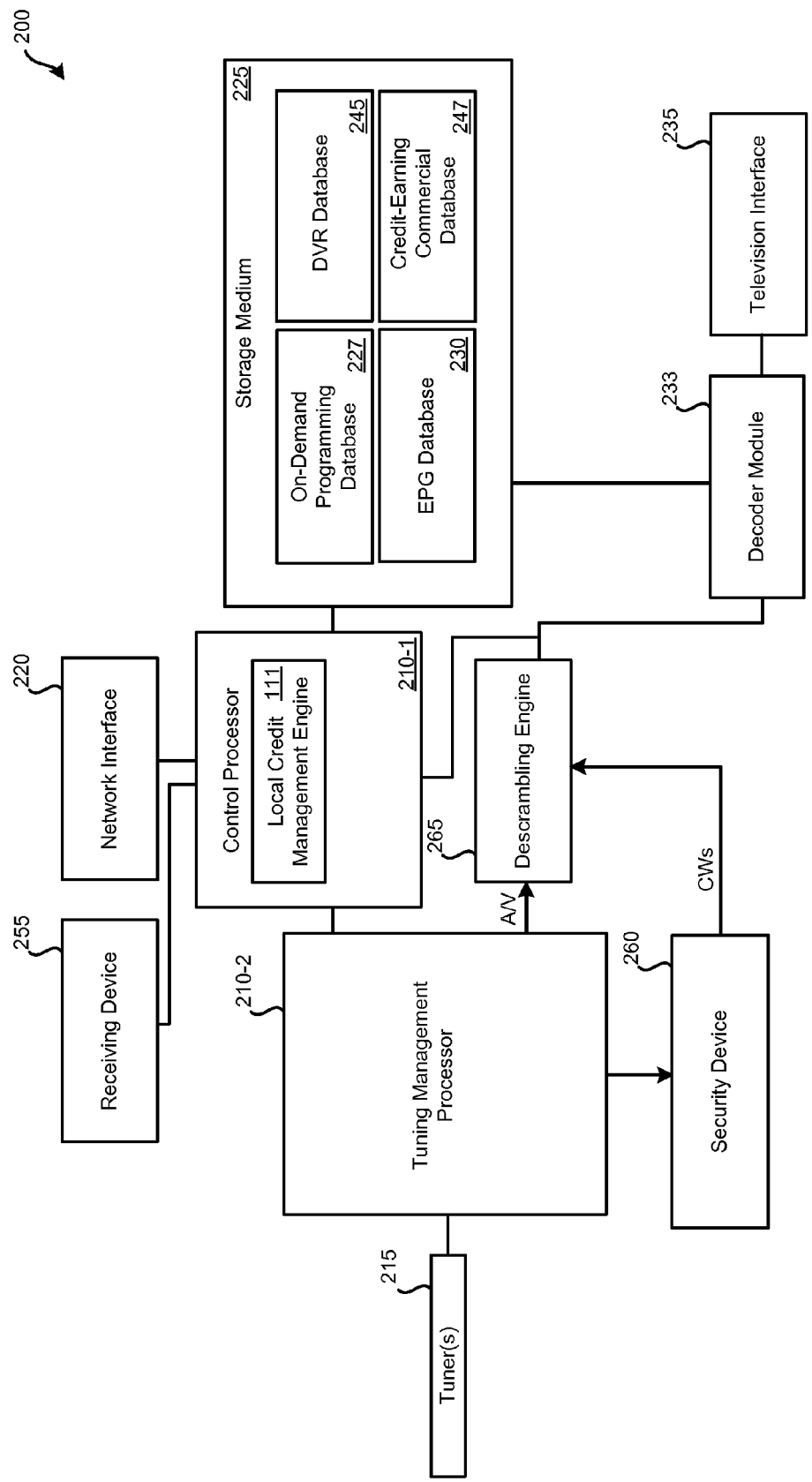
FIG. 2 illustrates an embodiment of a television receiver.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content and credit-earning commercials, may be stored to a computer-readable storage medium. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include local credit management engine 111, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Downlink signal 180-1 represents a signal between satellite 130-1 and satellite dish 140. Downlink signal 180-2 represents a signal between satellite 130-2 and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180-1 may be a first transponder stream containing a first group of television channels, while downlink signal 180-2 may be a second transponder stream containing a different group of television channels. In addition to or instead of containing television channels, a transponder stream can be used to transmit on-demand content to television receivers, including PPV content and credit-earning commercials (which may be stored locally by the television receiver until output for presentation).

FIG. 1 illustrates downlink signal 180-1 and downlink signal 180-2, being received by satellite dish 140 and distributed to television receiver 150. For a first group of television channels, satellite dish 140 may receive downlink signal 180-1 and for a second group of channels, downlink signal 180-2 may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110. Network 190 may be used to provide various credit-earning commercials for storage to television receiver 150. Alternatively, such credit-earning commercials may be transmitted to television receiver 150 via satellite or another form of television-signal distribution (e.g., an IP-based network, a cable network, wireless broadcast, etc.). Accordingly, while FIG. 1 is focused on satellite-based television signal distribution, such distribution may be performed via various other types of distribution networks. In addition or in alternate to network 190, a telephone (e.g., landline) or cellular connection may be used to enable communication between television receiver 150 and television service provider system 110.

A television service provider system such as satellite television distribution system 100 may include system credit management engine 112. System credit management engine 112 may be configured to receive data from television receivers, such as television receiver 150, via a communication link. In some embodiments, network 190 may be used to transmit data from television receiver 150 to system credit management engine 112. In other embodiments, a dial-up connection, wireless network link, or some other form of communication may be used instead of network 190 to communicate from television receiver 150 to system credit management engine 112. (Communication via satellites 130 may be unidirectional to television receivers.) The data transmitted from a television receiver, such as television receiver 150, to system credit management engine 112 may include indications of one or more of the following: indications of credit-earning commercials watched by a user, indications of amounts of earned credits, indications of an account number associated with earned credits, indications of quiz answers and/or survey responses received from a user, and/or indications of which television commercials received click-throughs.

System credit management engine 112 may also aggregate the number of times a credit-earning commercial has been viewed by multiple users at multiple television receivers. Periodically, this information may be used for billing an entity associated with the commercial. System credit management engine 112 may also serve to relay aggregated results from surveys and/or quizzes to entities associated with the commercial. Further, based on data stored about a user and/or which credit-based commercials a user has historically watched, system credit management engine 112 may select future credit-earning commercials to be provided to television receiver 150 of the user.

FIG. 2 illustrates an embodiment of a television receiver 200, which may represent television receiver 150 of FIG. 1. Television receiver 200 may be configured to receive, store, output, and log the viewing of credit-earning television commercials. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, digital video recorder (DVR) database 245 (which may include provider-managed television programming storage and/or user-defined television programming), on-demand programming database 227, credit-earning commercial database 247, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and remote control interface 250. Control processor 210-1 may handle incoming data from network interface 220 and remote control interface 250. Additionally, control processor 210-1 may be configured to output data via network interface 220.

Control processor 210-1 may include local credit management engine 111. Local credit management engine 111 may be configured to output graphical user interfaces for presentation that allow a user to select and play back various stored credit-earning commercials. Exemplary graphical user interfaces are presented in relation to FIGS. 3 and 4. Credit-earning commercials may be received via tuners 215, via network interface 220, or via some other communication arrangement with the television service provider system. Credit-earning commercials may be stored to credit-earning commercial database 247. As a user views and is confirmed to have viewed credit-earning television commercials, a local database, which may be separate or part of credit-earning commercial database 247, may be updated by local credit management engine 111 to be indicative of credits earned by a user. Local credit management engine 111 may also log quiz and/or survey responses made for a credit-earning commercial by a user. The local credit management engine 111 may, after a commercial has been viewed or on a predefined schedule (e.g., once per night), transmit indications of earned credit, spent credit, quiz responses and/or survey responses to the system credit management engine 112.

Local credit management engine 111 may also manage the purchase of PPV content, other forms of content, and/or merchandise using credits. Local credit management engine 111 may permit stored PPV content, which may be stored by on-demand programming database 227 to be purchased for viewing and output for presentation. Local credit management engine 111 may be configured to deduct an amount of credit from a user account based on credit redeemed for viewing of PPV content or another form of content. In some embodiments, user accounts that stored earned credits are stored by system credit management engine 112. In such embodiments, it may be necessary for local credit management engine 111 to contact television service provider system 110 to credit or debit an amount of credit from a user's account. In other embodiments, such crediting and debiting can be performed locally at the television receiver (with, possibly, the system credit management engine being only periodically updated).

Additionally or alternatively, local credit management engine 111 may be used to monitor click-throughs which occur in relation to broadcast (or previously recorded) television commercials. In some embodiments, a television commercial may be output for presentation live (e.g., not from DVR-based storage or on-demand storage). During presentation of such a commercial, a pop-up may be output for presentation concurrently by television receiver 200. A user may provide input and "click-through" the popup (or other form of graphical indicator) to access information (e.g., a website) associated with the commercial. In some embodiments of television receiver 200, local credit management engine 111 monitors such click-throughs and credits a user's account based on the click-throughs. Local credit management engine 111 may provide system credit management engine 112 with information about which users have clicked-through which commercials.

Tuners 215 may include one or more tuners used to tune to transponders that include broadcasts of one or more television channels. Such tuners may be used also to receive for storage on-demand content and/or credit-earning television commercials. In some embodiments, two, three, or more than three tuners may be present, such as four, six, or eight tuners. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, and/or credit-earning commercial database 247. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider (e.g., a cable network). Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may also serve to output a CVM.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200. Commercials recorded to DVR database 245 as part of a program recorded based on a timer may be presented in conjunction with pop-ups, which may be tied to earn commercial-viewing credits.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming database 227 may store additional television programming. On-demand programming database 227 may include television programming that was not recorded to storage medium 225 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet. Typically, on-demand programming is presented commercial-free.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card or the like.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

Credit-earning commercial database 247 may be used to store commercials that a user can view to earn credits. Such commercials may be received via tuners 215 and stored to storage medium 225 as part of credit-earning commercial database 247 or may be received via network interface 220 (or some other communication arrangement). In some embodiments, after a commercial has been viewed and/or the credits associated with the commercial earned, the commercial may be deleted from credit-earning commercial database 247. Credit-earning commercial database 247 may also store interactive quizzes and/or surveys that can be required to be completed in order for a user to confirm that a commercial has been viewed and/or to receive the associated credits. Which commercials of credit-earning commercial database 247 are viewed may be used to determine future commercials to be provided to and stored by credit-earning commercial database 247.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 700 of FIG. 7.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 3:
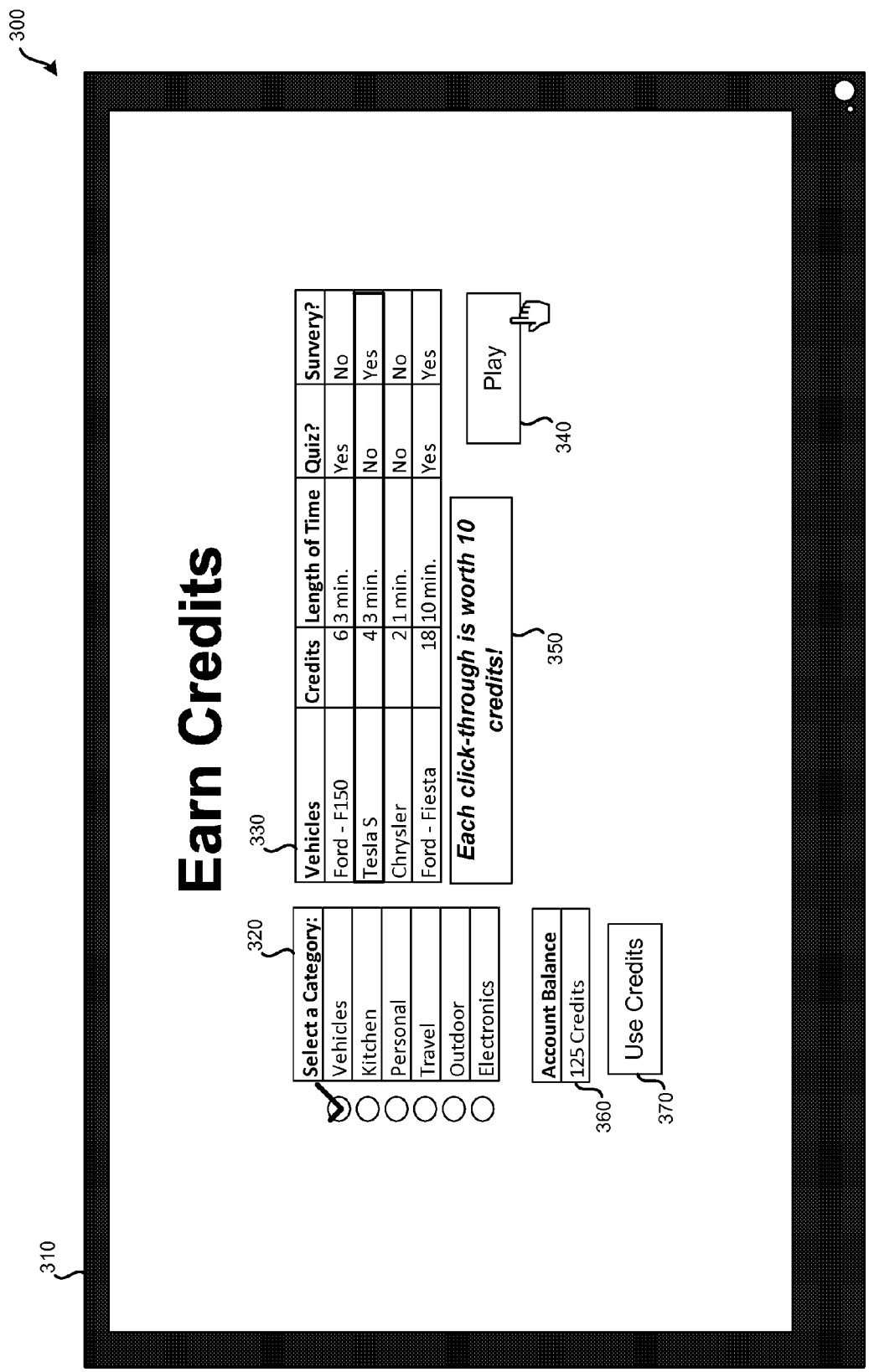
FIG. 3 illustrates an embodiment of a graphical user interface output by a television receiver for earning credits.

FIG. 3 illustrates an embodiment 300 of a graphical user interface (GUI) output by a television receiver for earning credits. The GUI displayed by television 310 may be also presented by another form of display device, such as a monitor. A television receiver, such as television receiver 200 of FIG. 2, may output the GUI for presentation to a television or other form of display device.

The GUI of FIG. 3 may provide a user with an opportunity to view various credit-earning television commercials. Such television commercials may be stored locally: referring to FIG. 2, credit-earning commercial database 247 may be used to store such credit-earning television commercials. In some embodiments, a user is permitted to select a category of commercials that the user is interested in. Menu 320 allows a user to select among exemplary categories, such as vehicle commercials (which is illustrated as selected). Menu 330 lists the various commercials available within the currently-selected category. In the illustrated embodiment, the user has the option to select among four vehicle commercials. Menu 320 may provide various information about each credit-earning commercial within the selected category: the name of the commercial (e.g., type of vehicle), the number of credits that will be earned by viewing the commercial, the length of the commercial, whether a quiz must be completed after the commercial (e.g., to earn the credits), and/or whether a survey must be completed after the commercial (e.g., to earn the credits). Other data fields are also possible within menu 320. The user may select a particular commercial to view or may elect to have all of the commercials presented in sequence. A user may select play button 340 once one or more credit-earning television commercials are selected. In some embodiments, commercials which have already been played back and had their credits earned will be indicated as redeemed, such as by graying-out selection of the already-redeemed commercial. In some embodiments, a user may select a category of credit-earning commercial for playback, but not the specific commercial. As such, the user may not be aware of the specific advertiser that will be featured in the credit-earning commercial until playback commences.

In some embodiments, a user may be permitted to provide various demographic information about themselves, such as an age, job, sex, location, income, etc. Advertisers may be willing to pay more for targeted user demographics, thus allowing a greater number of credits to be awarded for commercials viewed that are specifically targeted to the user's demographics.

Notice 350 may serve to alert a user that commercial click-throughs are worth ten credits each. Such click-throughs may be relevant to commercials that are output for presentation live (e.g., via a received broadcast signal) and/or were recorded using DVR functionality based on a timer set to record a specific television program. When a pop-up is presented by the television receiver during such commercials, the user providing input in response to such a pop-up may result in the user earning the number of credits indicated in notice 350. For instance, such input may result in additional information about the product or advertiser being presented to the user (e.g., via a webpage or locally-stored graphical element).

The user's account balance 360 may indicate the amount of credit that the user has earned. Account balance 360 may be for an individual user or may be for the television receiver in general. In some embodiments, a user may be required to log in by providing authentication data, such as a username and password, before using or earning credits. In other embodiments, all users of a particular television receiver may pool earned credits into a single account. Button 370 may permit a user to redeem credits, such as in accordance with FIG. 4. As such, clicking button 370 may direct a user to the GUI of embodiment 400.

Figure 4:
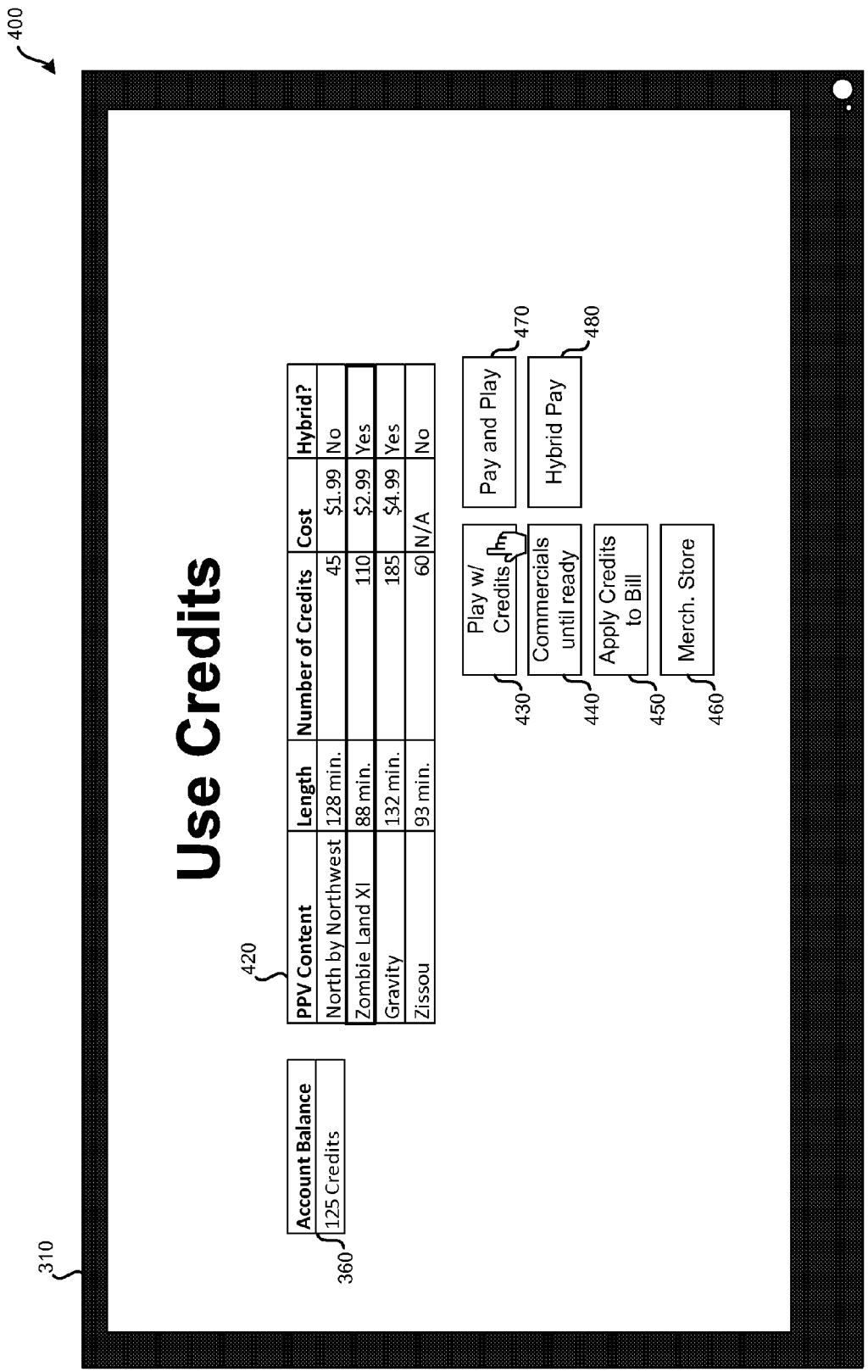
FIG. 4 illustrates an embodiment of a graphical user interface output by a television receiver for using credits.

FIG. 4 illustrates an embodiment 400 of a graphical user interface output by a television receiver for using or redeeming credits. The GUI displayed by television 310 may be also presented by another form of display device, such as a monitor, tablet computer, cellular phone, etc. A television receiver, such as television receiver 200 of FIG. 2, may output the GUI for presentation to a television or other form of display device. In some embodiments, credits can be redeemed for viewing of pay-per-view content or other on-demand content that will be presented commercial-free.

In embodiment 400, account balance 360 may be presented. Menu 420 may permit a user to select PPV content that the user desires to view. Information that may be presented as part of menu 420 for each piece of content can include: the length of time, the amount of credits needed to view, the cost (if credits are not to be used), and/or whether hybrid payment is accepted. Hybrid payment may allow for partial payment using credits and partial payment using money. Such an arrangement may be useful if the user does not have a sufficient amount of earned credit to view a piece of content, but desires to use the credits the user does have to reduce the cost. In such instances, credits may be assigned a fixed value, such as 25 credits equal a dollar of credit for use during a hybrid purchase.

Selection of button 430 may permit a user to complete a purchase of the rights to view a piece of content by redeeming an amount of credit. The account balance may be verified to contain sufficient credits, either at the television receiver or at a system credit management engine. The account balance may then be debited by the amount of redeemed credits. In some embodiments, if account balance 360 is insufficient to view a piece of content, a user may select a "commercials until ready" button 440, which may result in commercials being presented until a sufficient amount of credit has been earned to view the selected piece of content. In some embodiments, immediately thereafter the selected piece of content will begin playback.

In some embodiments, a user may select an apply credits to bill button 450. This may apply some or all earned amounts of credit to a user's bill with a television service provider according to a predefined formula, such as 25 credits for a dollar of credit. In some embodiments, in addition or instead of redeeming credits for viewing of content, credits may be redeemed for merchandise, either directly from the television service provider or through retailers that have established an agreement with the television service provider. A store button 460 may permit such redemption of credits for merchandise (or services). A pay and play button 470 may be present that allows a user to pay money to view a piece of content. The cost may be added to a user's monthly subscription bill. In some embodiments, if such a selection is made, the user may be permitted to apply credits retroactively (e.g., credits earned after viewing) to payment for the piece of content. For example, if a movie worth 185 credits is watched and the user pays the monetary cost, if the user earns 185 credits before a predefined amount of time (e.g., the next billing cycle), the user may be permitted to switch payment from money to credits. Finally, a hybrid pay button 480 may permit purchase of a piece of content for viewing to be made with credits and money. In some embodiments, retroactive credit payment may also be performed in a hybrid payment situation: credits earned after viewing may be applied to reduce the cost of viewing the piece of content. In some embodiments, in order to encourage a user to view credit-earning commercials and/or use click-throughs, certain pieces of on-demand content may be only permitted to be accessed via credit redemption.

The embodiments of FIGS. 3 and 4 are intended to be exemplary only. Therefore, the actual content of each GUI may vary by embodiment. The naming of buttons or types of interaction elements (buttons, check boxes, lists, etc.) may vary by embodiment. Additional or fewer elements may be present in each exemplary embodiment.

Figure 5:
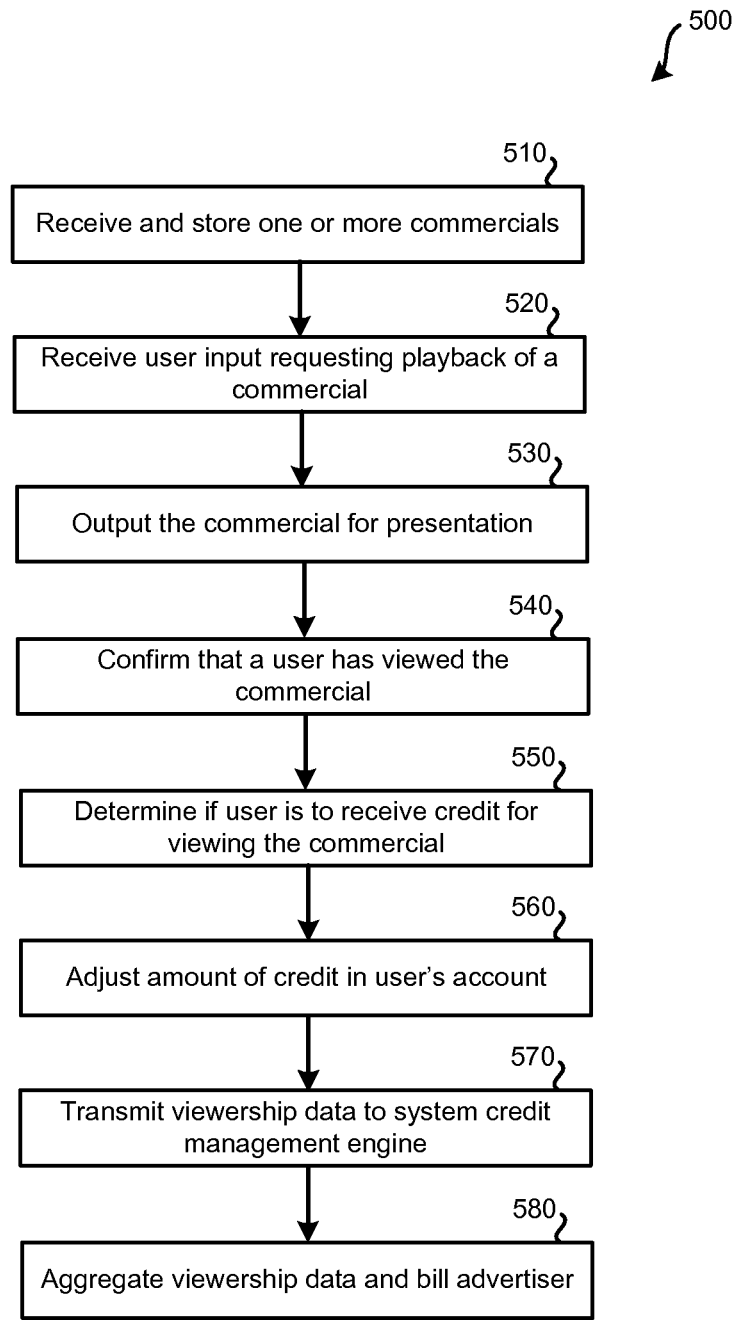
FIG. 5 illustrates an embodiment of a method for earning credits.

FIG. 5 illustrates an embodiment of a method 500 for earning credits. Method 500 may be performed using television receiver 200 of FIG. 2. Method 500 may also be performed by components of satellite television distribution system 100, including television receiver 150, of FIG. 1. Method 500 may involve a GUI similar to embodiment 300 of FIG. 3 being presented and used for receiving user input. The steps of method 500 may be performed using various components of the television receiver. The television receiver used to perform method 500 may be computerized. Accordingly, one or more instances of components of computer system 700 of FIG. 7 may be used in performing method 500. Accordingly, the means for performing method 500 may include one or more instances of components of a television receiver as detailed in relation to FIG. 2 and/or one or more instances of components of computer system.

At step 510, one or more commercials through which credit may be earned may be received and stored by television receiver. These one or more credit-earning commercials may be received via a transponder stream. For instance, credit-earning commercials may be transmitted to a group of television receivers, which each store the credit-earning commercials. In some embodiments, these credit-earning commercials are transmitted to television receivers via satellite, such as illustrated in relation to FIG. 1. In some embodiments, credit-earning commercials may be distributed via one or more networks, such as the Internet, to television receivers. In some embodiments, other forms of a television distribution network, such as a cable network or IP-based network, may be used to distribute credit-earning commercials to television receivers. In some embodiments, the credit-earning commercials stored at step 510 may be based on user preferences. For instance, only television commercials related to a user's demographics may be stored at step 510. As an example, a television receiver may store demographic information for its user, such as the user's age range (e.g., 30-39). The television receiver may be configured to only store credit-earning commercials that are directed to the user's age range. In addition to an age range, other demographic information may be used such as: income range, types of programming watched, geographic region, sex, time of day during which television programming is typically watched, etc.

Based on whichever credit-earning commercials are stored, a listing of available credit-earning commercials may be created and output for presentation to a user. At step 520, user input may be received that requests playback of a specific credit-earning commercial that was stored at step 510. In some embodiments, rather than the user selecting the specific earning commercial to be viewed, the television receiver may make the selection for the user. For instance, the user may only select a category or, even more generally, may only indicate that credit-earning commercials desired be viewed. At step 520, the user input may be received in response to a GUI being presented to the user, such as the GUI of FIG. 2. The credit-earning commercial may be selected based on characteristics of the user or of the television receiver.

At step 530, the credit-earning commercial that was either selected by the user or selected by the television receiver at step 520 may be output for presentation. Output for presentation may involve audio and/or video being output, such as to a presentation device. The television receiver may monitor output of the commercial at step 530 to ensure the entire credit in the commercial is output. For instance, fast forwarding may not be permitted. In some embodiments, if the television receiver has a camera or other user-detection device, it may be ensured that a user is in fact present for presentation of the credit-earning commercial. If not, presentation of the credit-earning commercial may be paused or credits will not be earned for presentation of the credit-earning commercial.

In addition to earning credits via viewing credit-earning commercials, a user may provide input (e.g., a click-through) during a broadcast or commercial recorded from a broadcast. If the user provides such a click-through in response to a pop-up presented during such a commercial, the user may earn a predefined amount of credit which is credited to the user's account.

At step 540, after completion of the credit or commercial being output for presentation, it may be confirmed that the user has in fact viewed the commercial. As previously detailed, this may involve determining whether a user was in fact present for the entire credit-earning commercial. In some embodiments, the confirmation of step 540 may be performed by presenting a quiz to the user. Correct answers to one or more questions may be required to confirm the user has viewed the credit-earning commercial. In some embodiments, a survey may be presented to the user. The user may be required to complete one or more survey questions in order to receive the credits from the credit-earning commercial. In some embodiments, after viewing a credit-earning commercial, the user may be presented with a webpage of the advertiser associated with the commercial. The user may be required to input a code presented during the commercial or provide some other input to the webpage which will trigger the users' account to be credited with the amount of credits associated with the credit-earning commercial. In some embodiments, the confirmation of step 540 may be as simple as the user being required to push a button on a remote control after presentation of the credit-earning commercial; this input may serve to determine whether a user is in fact present at the display device that presented the commercial.

At step 550, it may be determined whether the user is to receive credit for viewing the commercial. The determination of step 550 may be based on the confirmation of step 540. For instance, if the user answered a sufficient number of questions during the quiz correctly, it may be determined that the user does receive credit at step 550. If confirmation of step 540 is unsuccessful, it may be determined at step 550 that the user does not receive credit for the commercial. In some embodiments, the user may be permitted to retake the quiz or survey in order to earn the credits. If the user has successfully earned credits for viewing a credit-earning commercial, additionally at step 550 the commercial may be marked as viewed such that it cannot be viewed again for earning credits (viewing again may be permitted). In some embodiments, after viewing for credits, the credit-earning commercial may be deleted from the television receiver.

If the user does earn credit for viewing the credit-earning television commercial, the user's account may be adjusted to reflect the earned credit at step 560. This may involve an indication of the amount of credits in the account stored locally by the television receiver being increased. Additionally or alternatively, television receiver may transmit an indication of earned credits to a remotely stored database, such as maintained by system credit management engine 112 of satellite television distribution system 100.

At step 570, viewership data may be transmitted to a system credit management engine. This viewership data may include information that may be useful to the television service provider and/or the advertiser associated with the credit-earning commercial. For instance, quiz answers and/or survey responses may be transmitted to the credit management engine. Additionally, demographic information/characteristics of the user who viewed the credit-earning commercial may be transmitted to the system credit management engine.

Step 580 may be performed by the system credit management engine. At step 580, the viewership data received may be aggregated with other viewership data related to viewing of the same credit-earning commercial by other users and transmitted to the advertiser associated with the commercial. Similarly, a cost associated with the commercial may be billed to the advertiser for each user that was confirmed to have viewed the credit-earning commercial. The cost may be reflective of the amount of credit earned by the user and an amount of profit built in by the television service provider. For instance, if it is determined that 25 credits is worth one dollar in playback of stored content (e.g., PPV content), the advertiser may be billed $1.10 for every 25 credits earned by users based on the advertiser's credit-earning commercial.

Figure 6:
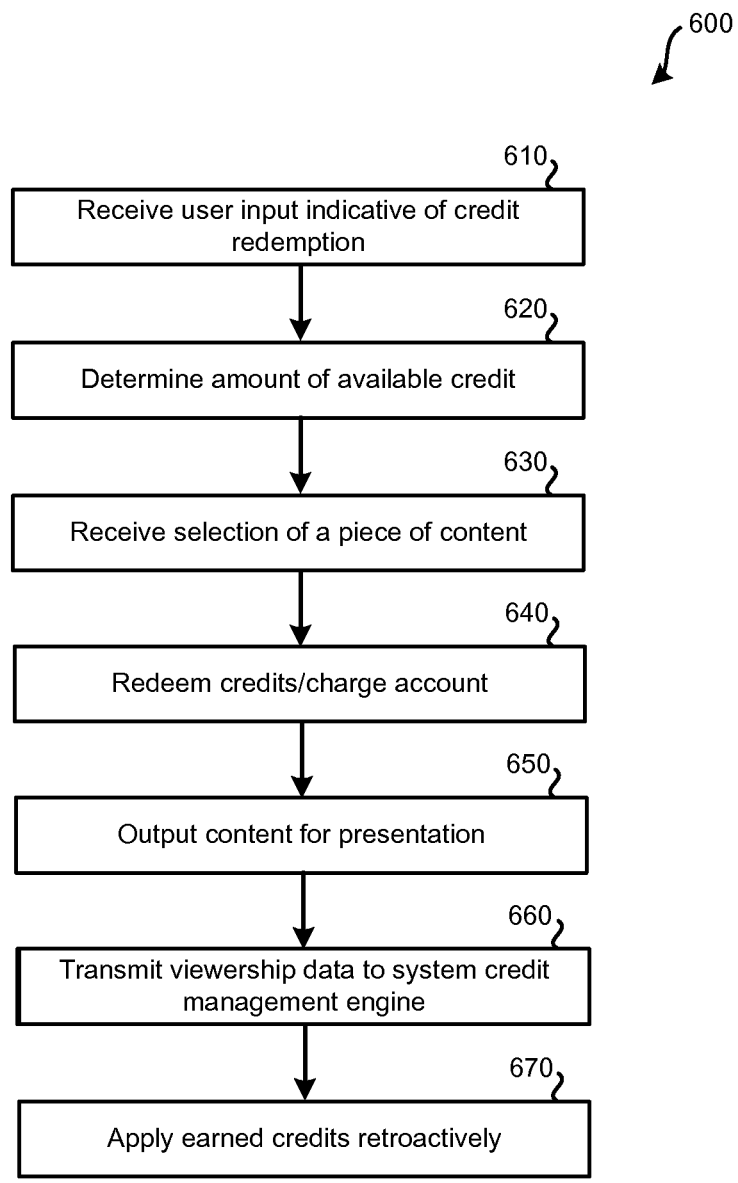
FIG. 6 illustrates an embodiment of a method for using credits.

While FIG. 5 illustrates an embodiment of a method 500 for earning credits, FIG. 6 illustrates an embodiment of a method 600 for using credits. Method 600 may be performed using television receiver 200 of FIG. 2. Method 600 may also be performed by components of satellite television distribution system 100, including television receiver 150, of FIG. 1. Method 600 may involve a GUI, similar to embodiment 300 of FIG. 3, being presented and used for receiving user input. The steps of method 600 may be performed using various components of the television receiver. The television receiver used to perform method 600 may be computerized. Accordingly, one or more instances of components of computer system 700 of FIG. 7 may be used in performing method 500. Accordingly, the means for performing method 600 may include one or more instances of components of a television receiver as detailed in relation to FIG. 2 and/or one or more instances of components of computer system. Method 600 may be performed after credits have been earned in accordance with method 500.

At step 610, user input may be received that is indicative of a user desiring to perform credit redemption. For instance, at step 610, a user may access a menu that allows the user to select various on-demand (e.g., PPV) content that can be watched in exchange for redemption of credits earned for viewing credit-earning commercials and/or performing click-throughs on pop-up advertisements presented during broadcast or recorded programming. For instance, at step 610, the user input may be received in response to a GUI such as that presented in FIG. 4.

At step 620, it may be a determined amount of credit that the user has available. An indication of the amount of available credit may be stored locally by the television receiver. In some embodiments, the television receiver may contact a remote database, such as at a system credit management engine, to determine the amount of credit that the user has available for use.

At step 630, the user may select a piece of content that the user desires to view. This piece of content may require an amount of credits be redeemed for viewing. Each piece of content that is available for viewing may already be stored locally by the television receiver. However, such content may remain encrypted. Therefore, in some embodiments, both the credit-earning commercials and the on-demand content that can be watched via redeemed credits is stored locally by the television receiver. After the piece of content has been selected, if the user has a sufficient number of credits, the user may redeem the credits at step 640 for viewing of the piece of content. This may involve the user's account being debited for the appropriate amount of credits. In some embodiments, if sufficient credits are not available, the user may be permitted to watch credit-earning commercials until a sufficient number of credits have been earned. A user may also be permitted to select a hybrid payment scheme, which involves a portion of payment for viewing of the piece of content being paid in credits and a second portion the payment being made with money. As such, in such embodiments, it may not be necessary for the user to have a sufficient number of credits in order to view a particular piece of content. Step 640 may involve the user's account being debited for the proper amount of credits and/or the user's account being charged for the amount of money associated with viewing the piece of content. Step 640 may also involve transmitting payment data and/or credit or redemption data to a system credit management engine.

Once the user's account has been adjusted in view of the redeemed credits and/or payment, the piece of content may be output for presentation at step 650. The on-demand piece of content may be output without commercials. In some embodiments, if sufficient credits were not earned for redemption of viewing of the piece of content, the piece of content may still be output for presentation at step 650; however, playback of the piece of content may be interspersed with one or more commercials. As such, by viewing credit-earning commercials ahead of playback of the piece of content and/or performing click-throughs, the user may avoid having commercials interspersed during viewing of the piece of content.

At step 660, viewership data may be transmitted to a system credit management engine. Such viewership data may be used to determine which piece of on-demand content a user viewed using credits and/or payment. Further, such viewership data may be used to better target credit-earning commercials.

In some embodiments, if a user paid for viewing a piece of content, it may be possible for the user to earn and redeem credits retroactively. By doing so, the user may avoid having to pay money for viewing a piece of on-demand content. To apply an amount of credit earned retroactively, the user may be required to earn the amount of credit during a same billing cycle during which the piece of content was purchased or within some other predefined amount of time. The user may also be required to provide input that indicates that the earned credits are to be applied to the purchase of the piece content output for presentation at step 670.

Figure 7:
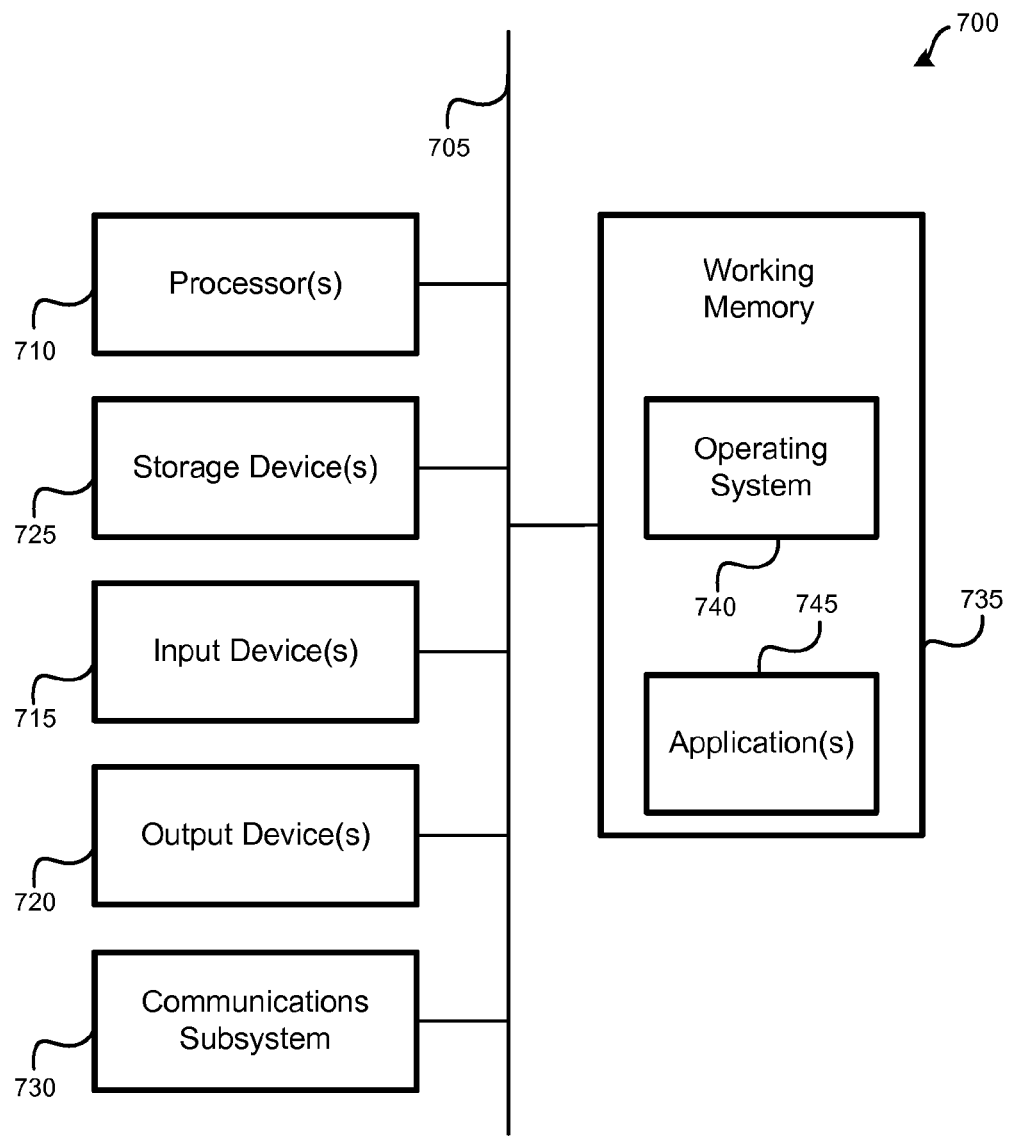
FIG. 7 illustrates an embodiment of a computer system.

A computer system as illustrated in FIG. 7 may be incorporated as part of the previously described computerized devices, such as the television receivers and the television service provider systems. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

While this application focuses on on-demand programming, other forms of digitized content may be equally applicable, such as electronic books, electronic magazines, pay websites (e.g., subscription based websites), music. Non digitized content is also possible, such as receiving services, electronics, computers, tools, etc. in exchange for viewing commercials.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver system configured to provide content-viewing credit, the television receiver system comprising:
   one or more tuners;
   one or more processors; and
   a memory communicatively coupled with and readable by the one or more processors and having stored therein processor-readable instructions which, when executed by the one or more processors, cause the one or more processors to:
      receive, via the one or more tuners, a first commercial, wherein the first commercial comprises video and audio;
      prior to receiving user input that selects the first commercial, output for presentation a user interface that indicates a plurality of commercials organized into a plurality of categories of commercials, wherein:
         user input is used to select a category of commercials from the plurality of categories of commercials;
         each commercial of the plurality of commercials is presented as associated with whether a survey is required to be answered;
         each commercial of the plurality of commercials is presented as being for a defined duration of time;
         each commercial of the plurality of commercials is visually indicated as associated with a predefined amount of credit; and
      receive user input that selects the category of commercials and the first commercial for viewing;
      output for presentation the first commercial for viewing for the defined duration of time by a user of the television receiver system, wherein the first commercial is associated with a first predefined amount of credit as indicated by the user interface;
      confirm that the first commercial has been viewed by the user; and
      in response to confirming that the first commercial has been viewed by the user, credit an account of the user with the first predefined amount of credit.

2. The television receiver system configured to provide the content-viewing credit of claim 1, wherein the processor-readable instructions, when executed, further cause the one or more processors to:
   receive user input that selects a pay-per-view piece of content, wherein the pay-per-view piece of content is associated with a second predefined amount of credit;
   receive user input indicative of applying credit from the account of the user to purchase of presentation of the pay-per-view piece of content;
   determine that a third amount of credit available in the account of the user is equal to or greater than the second predefined amount of credit; and
   after determining that an amount of credit in the account of the user is equal to or greater than the second predefined amount of credit, commence presentation of the pay-per-view piece of content.

3. The television receiver system configured to provide the content-viewing credit of claim 2, wherein the processor-readable instructions, when executed, further cause the one or more processors to:
   store the first commercial to the memory of the television receiver system prior to outputting for presentation the first commercial; and
   store the pay-per-view piece of content to the memory of the television receiver system prior to outputting for presentation the first commercial.

4. The television receiver system configured to provide the content-viewing credit of claim 1, wherein the processor-readable instructions that cause the one or more processors to confirm that the first commercial has been viewed by the user comprise processor-readable instructions which, when executed, cause the one or more processors to:
   output for presentation, concurrently with video of the first commercial being output, a graphical element prompting user input;
   receive user input in response to the graphical element; and
   in response to the user input, output for presentation information related to the first commercial.

5. The television receiver system configured to provide content-viewing credit of claim 1, the television receiver system further comprising:
   a system credit management engine, configured to:
      receive, from a plurality of television receivers, indications of the first commercial being viewed; and
      based on the indications of the first commercial being viewed, billing an entity associated with the first commercial an amount based on a quantity of indications.

6. A method for providing content-viewing credit, the method comprising:
   receiving, via one or more tuners of a television receiver, a first commercial, wherein the first commercial comprises video and audio;
   prior to receiving user input that selects the first commercial, outputting, by the television receiver, for presentation a user interface that indicates a plurality of commercials organized into a plurality of categories of commercials, wherein:
      user input is used to select a category of commercials from a plurality of categories of commercials;
      each commercial of the plurality of commercials is presented as associated with whether a survey is required to be answered;
      each commercial of the plurality of commercials is presented as being for a defined duration of time;
      each commercial of the plurality of commercials is visually indicated as associated with a predefined amount of credit; and
   receiving, by the television receiver, user input that selects the category of commercials and the first commercial for viewing;
   outputting, by the television receiver, for the defined duration of time, for presentation the first commercial for viewing by a user, wherein the first commercial is associated with a first predefined amount of credit as indicated by the user interface;

confirming, by the television receiver, that the first commercial has been viewed by the user; and in response to confirming that the first commercial has been viewed by the user, crediting, by the television receiver, an account of the user with the first predefined amount of credit.

7. The method for providing the content-viewing credit of claim 6, the method further comprising:

receiving, by the television receiver, user input that selects a pay-per-view piece of content, wherein the pay-per-view piece of content is associated with a second predefined amount of credit;

receiving, by the television receiver, user input indicative of applying credit from the account of the user to purchase of presentation of the pay-per-view piece of content;

determining that a third amount of credit available in the account of the user is equal to or greater than the second predefined amount of credit; and after determining that an amount of credit in the account of the user is equal to or greater than the second predefined amount of credit, commencing presentation of the pay-per-view piece of content.

8. The method for providing the content-viewing credit of claim 7, the method further comprising:

storing, by the television receiver, the first commercial to a memory of the television receiver prior to outputting for presentation the first commercial; and storing, by the television receiver, the pay-per-view piece of content to the memory of the television receiver prior to outputting for presentation the first commercial.

9. The method for providing the content-viewing credit of claim 6, wherein confirming that the first commercial has been viewed by the user comprises:

outputting, by the television receiver, for presentation, concurrently with video of the first commercial being output, a graphical element prompting user input;

receiving, by the television receiver, user input in response to the graphical element; and in response to the user input, outputting, by the television receiver, for presentation information related to the first commercial.

10. The method for providing content-viewing credit of claim 6, the method further comprising:

receiving, from a plurality of television receivers, by a server system, indications of the first commercial being viewed; and based on the indications of the first commercial being viewed, billing an entity associated with the first commercial an amount based on a quantity of indications.

11. A non-transitory processor-readable medium for providing content-viewing credit, comprising processor-readable instructions configured to cause one or more processors to:

receive a first commercial, wherein the first commercial comprises video and audio;

prior to receiving user input that selects the first commercial, output for presentation a user interface that indicates a plurality of commercials organized into a plurality of categories of commercials, wherein:

user input is used to select a category of commercials from a plurality of categories of commercials;

each commercial of the plurality of commercials is presented as associated with whether a survey is required to be answered;

each commercial of the plurality of commercials is presented as being for a defined duration of time;

each commercial of the plurality of commercials is visually indicated as associated with a predefined amount of credit; and receive user input that selects the category of commercials and the first commercial for viewing;

output for presentation the first commercial for viewing for the defined duration of time by a user, wherein the first commercial is associated with a first predefined amount of credit as indicated by the user interface;

confirm that the first commercial has been viewed by the user; and in response to confirming that the first commercial has been viewed by the user, credit an account of the user with the first predefined amount of credit.

12. The non-transitory processor-readable medium for providing the content-viewing credit of claim 11, wherein the processor-readable instructions are further configured to cause the one or more processors to:

receive user input that selects a pay-per-view piece of content, wherein the pay-per-view piece of content is associated with a second predefined amount of credit;

receive user input indicative of applying credit from the account of the user to purchase of presentation of the pay-per-view piece of content;

determine that a third amount of credit available in the account of the user is equal to or greater than the second predefined amount of credit; and after determining that an amount of credit in the account of the user is equal to or greater than the second predefined amount of credit, commence presentation of the pay-per-view piece of content.

13. The non-transitory processor-readable medium for providing the content-viewing credit of claim 12, wherein the processor-readable instructions are further configured to cause the one or more processors to:

store the first commercial to a memory of a television receiver prior to outputting for presentation the first commercial; and store the pay-per-view piece of content to the memory of the television receiver prior to outputting for presentation the first commercial.

14. The non-transitory processor-readable medium for providing the content-viewing credit of claim 11, wherein the processor-readable instructions configured to cause the one or more processors to confirm that the first commercial has been viewed by the user comprise processor-readable instructions configured to cause the one or more processors to:

output for presentation, concurrently with video of the first commercial being output, a graphical element prompting user input;

receive user input in response to the graphical element; and in response to the user input, output for presentation information related to the first commercial.

* * * * *